Jan. 17, 1961 A. R. HOWELL ET AL 2,968,146
CONVERTIBLE TURBO-ROCKET AND RAM JET ENGINE
Filed Feb. 26, 1957 6 Sheets-Sheet 1

ALUN R. Howell
Charles E. Moss
Inventors
By
Attorneys

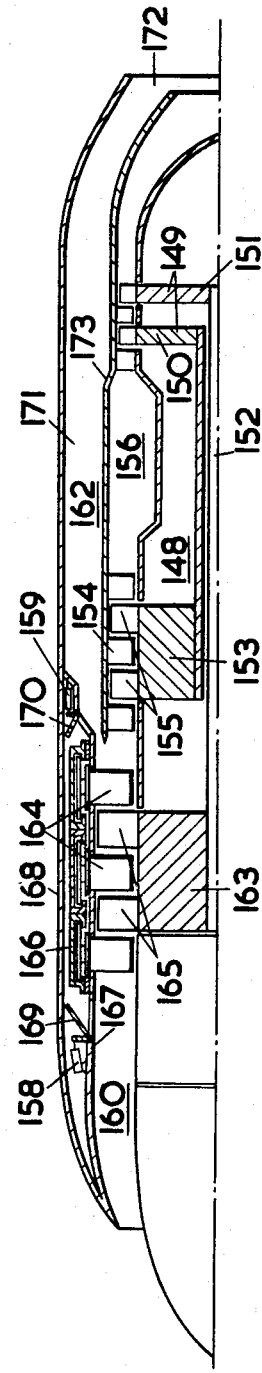

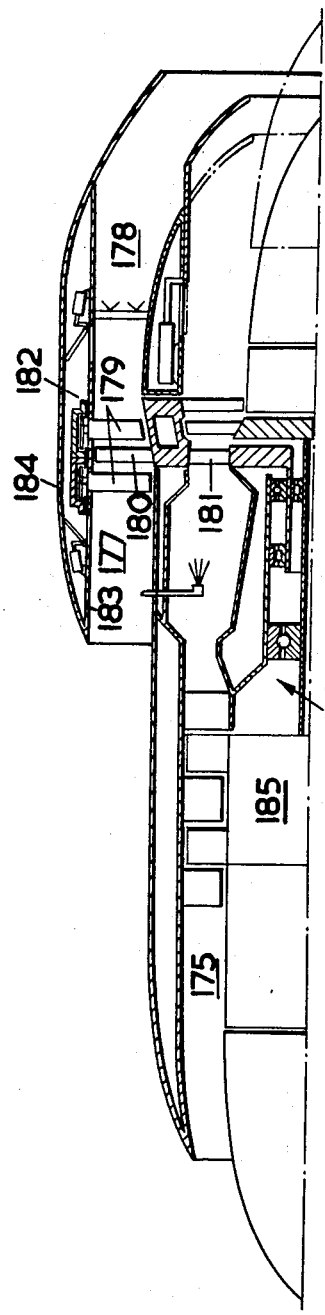

United States Patent Office 2,968,146
Patented Jan. 17, 1961

---

2,968,146
CONVERTIBLE TURBO-ROCKET AND RAM JET ENGINE

Alun Raymond Howell and Charles Ernest Moss, both of Cove, Farnborough, England, assignors to Power Jets (Research and Development) Limited, London, England, a British company Filed Feb. 26, 1957, Ser. No. 642,542

Claims priority, application Great Britain Mar. 23, 1956

12 Claims. (Cl. 60—35.6)

This invention relates to jet propulsion engines and particularly, though not exclusively, to jet engines for aircraft.

The form of jet engine most commonly used at present is the turbo-jet which sometimes is equipped for afterburning in the jet pipe so that higher thrusts may be obtained. In some forms of turbo-jet engine, propulsive reaction is developed not only by turbine exhaust gases but also by an additional airflow accelerated by the engine without passing through any turbine stages; by-pass engines and ducted fan engines are of this type and such engines may also be equipped for afterburning in the jet pipe as an alternative to or in addition to "co-burning" in the by-pass or fan duct. Very high speeds are at present attainable by means of rocket or ram-jet propulsion but both these forms of propulsion have serious disadvantages. In the case of the rocket, the specific fuel consumption is high. In the case of the ram jet, a certain minimum pressure ratio in the air intake must be achieved before operation on the ram jet principle can take place, and this condition is not readily obtainable until a minimum airspeed is reached; accordingly, at take-off auxiliary propulsion means are normally necessary.

A successful form of high speed jet propulsion plant may be provided by some combination of two or more forms of known jet propulsion system. In this connection it has already been proposed to employ a single engine, termed a turbo-rocket, in which the intake air passes through compressor blading located in an annular main gas duct, the rotating blade rows of which are driven by a turbine, located in a secondary duct, through which rocket gases are expanded into the main duct. The rocket gases mix with the air stream in the main duct and discharge to atmosphere as a propulsive jet. The turbo-rocket, like the turbo-jet but unlike the ram jet, is capable of taking off under its own power. It would be advantageous to have an aircraft propulsion engine, having for example some of the features of the turbo-rocket or turbo-jet, which could take off under its own power and which could be modified in flight for ram jet operation.

The present invention consists in a jet propulsion engine having therein an elastic fluid bladed compressor and means for withdrawing some or all of the compressor blades at least partially from the fluid path through the compressor.

The present invention also consists in a jet propulsion engine comprising a main duct having an air inlet at its upstream end and a propulsion nozzle at its downstream end, an elastic fluid bladed compressor located in the duct having means for withdrawing some or all of the compressor blades at least partially from the duct, a main combustion chamber formed in the duct downstream of the compressor, a rocket fuel combustion chamber arranged to discharge rocket gas through a secondary duct into the main combustion chamber and a turbine located in the secondary duct to be driven by the rocket gas and connected to drive the compressor.

The present invention further consists in a jet propulsion engine having therein an elastic fluid bladed compressor, said compressor comprising compressor walls defining a duct, compressor blades and means mounting the blades for movement between an operative position in which the blades extend across the duct and an inoperative position in which the blades are at least partially withdrawn from the duct.

Again, the present invention consists in an elastic fluid bladed compressor comprising compressor walls defining a duct, compressor blades and means mounting the blades for movement between an operative position in which the blades extend across the duct and an inoperative position in which the blades are at least partially withdrawn from the duct.

In the accompanying diagrammatic drawings:

Figure 5 is a half-elevation, part sectional, of a by-pass jet engine;

Figure 6 is a half-elevation, part sectional, of a ducted fan jet engine.

Figure 1:
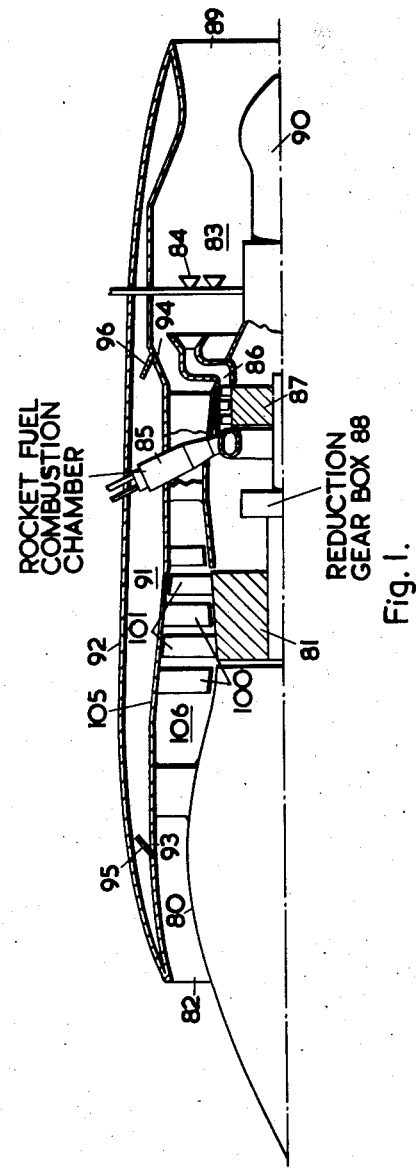
Figure 1 is a half-elevation, showing one form of turbo-rocket.

The turbo-rocket shown in Figure 1 comprises an annular main duct 106 formed between an inner duct wall 80 and an outer duct wall 105, an axial-flow compressor 81 located in the main duct to compress air entering the main duct through an intake 82, a ram jet combustion chamber 83 in the main duct downstream of the compressor provided with fuel combustion equipment 84, rocket fuel combustion chambers 85 arranged to discharge rocket gases into the main duct through a secondary duct 86 in which is located a turbine 87 connected to drive the compressor through a reduction gearbox 88, and a propulsion nozzle 89 at the rearward end of the main duct which is of convergent-divergent form and is made of variable area by means of an axially slidable centre body 90. A by-pass passage 91 is formed in parallel with the main duct between the outer wall 105 of the main duct and an engine casing 92, the passage having an inlet 93 upstream of the compressor and an outlet 94 downstream thereof. The inlet and outlet of the by-pass passage 91 are provided with flap closure members 95, 96 operated for example by hydraulic or pneumatic jacks. The general arrangement of the plant is the same as that shown in co-pending application Serial No. 612,628.

Figure 2:
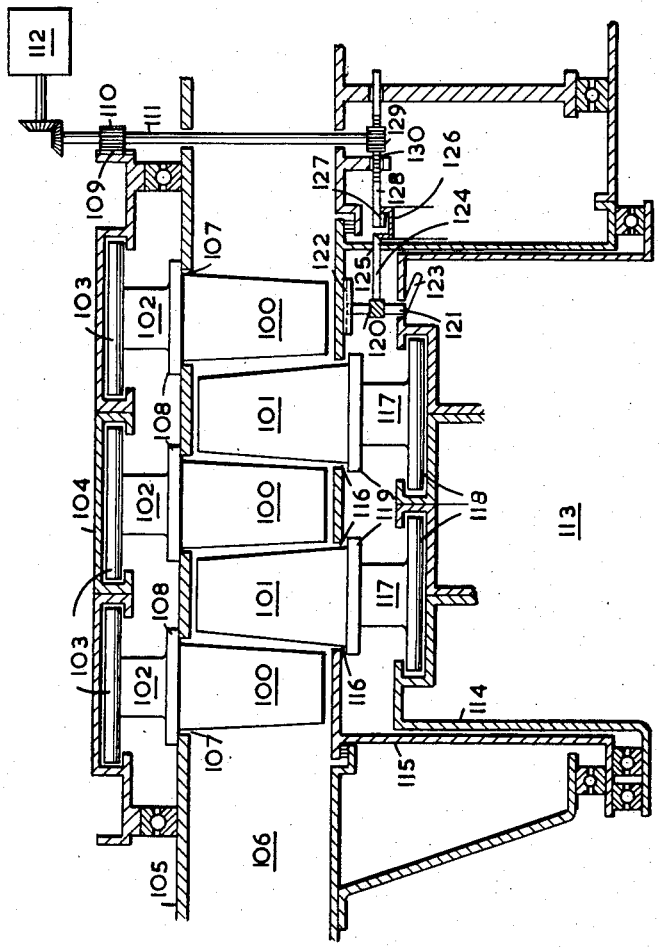
Figure 2 is a longitudinal half-section of a compressor forming part of the turbo-rocket according to Figure 1.

As shown in detail in Figure 2, the compressor 81 is provided wtih stator blades 100 and rotor blades 101 which are so mounted that on occasion they may be at least partly withdrawn for the compressor air stream. The compressor stator blades are connected by shanks 102 to root portions 103 which are pivotally mounted in a cylinder 104 coaxially surrounding and rotatably mounted on the outer wall 105 of the main duct 106. The stator blades extend across the duct through slits 107 in the outer wall of the duct and are supported by shoulders 108 formed on the blades which abut against the outer wall of the duct when the blades are in the operative position shown in Figures 2 and 3. A rack 109 formed on the rearward end of the cylinder 104 engages with a pinion 110 on a radially disposed shaft 111 which is rotated by an actuator 112, rotation of the shaft causing the cylinder to rotate relatively to the outer wall of the duct thereby withdrawing the blades through the slits from the operative position shown in Figure 3 to the inoperative position shown in Figure 4 in which the blades are housed between the cylinder 104 and the outer wall 105 of the duct.

The compressor rotor 113 comprises an inner drum 114 rotatably mounted coaxially within an outer drum 115. The rotor blades 101 which are formed in the same manner as the stator blades extend through slits 116 in the outer drum and have shanks 117 supporting roots 118 pivotally mounted in the inner drum 114, and shoulders 119 are formed on the blades to abut against the outer drum 115 in the operative position of the blades. Means are provided for rotating the inner and outer drums relatively to one another which comprise a ring 120 positioned between the walls of the two drums and supporting a number of arms 121 which extend radially with respect to the compressor axis, the radially outer end of each arm slidingly engaging in a longitudinally extending guideway 122 on the wall of the outer drum and the radially inner end of each arm slidingly engaging in a slot 123 formed in the wall of the inner drum at an angle to the guideway 122. The ring 120 is supported on a number of rods 124 which extend rearwardly through apertures 125 in the rear end wall of the outer drum 115 and support at their rearward ends a flanged ring 126. A roller 127 mounted on a sliding link 128 engages with the flanged ring 126, and is movable forwards or backwards by means of a pinion 129 on the shaft 111 which engages with a rack 130 on the sliding link 128. Forward or backward movement of the sliding link causes similar movement of the ring 126 and ring 120, and by the consequent relative rotation of the inner and outer drums of the rotor, the rotor blades are moved between the operative position shown in Figures 2 and 3 and the inoperative position shown in Figure 4.

At take-off and when climbing the engine operates on the turbo-rocket principle, that is to say fuel is injected into and burnt in the rocket fuel combustion chambers 85, and the rocket gases so produced discharge through the secondary duct 86 into the main duct downstream of the compressor. In so doing the gases drive the turbine 87 which in turn drives the compressor 81, and intake air flowing into the compressor in the main duct is discharged at a higher pressure to mix with the rocket gases in the ram jet combustion chamber 83. The composition of the rocket fuel, normally comprising a true fuel and an oxidant, is preferably adjusted to produce fuel rich rocket gases which will accordingly continue to burn in the air stream entering the ram jet combustion chamber. The combustion products finally discharge to atmosphere through the propulsion nozzle as a propulsive jet. Under cruising conditions however, at air speeds sufficient to permit ram jet operation, the rocket fuel supply to the rocket fuel combustion chambers may be terminated, and with the by-pass passage 91 open and the compressor blading retracted, the engine may be operated on the ram jet principle, the fuel supply which may consist only of true fuel being admitted to the ram jet combustion chamber through the fuel combustion equipment 84.

By varying the position of the inlet and outlet closure members 95, 96 of the by-pass passage 91, the division of air flow between this passage and the main duct may be varied. If the air flow is equally divided, the overall pressure losses may be reduced to less than a quarter of the value corresponding to all the flow going through the main duct.

In a modified form of turbo-rocket, other means may be used for withdrawing the blades of the compressor. For example each blade may be slidably mounted in an aperture in a supporting wall and have a root formed by a screw-threaded nut through which a screw-threaded rod extends, rotation of the rod serving to withdraw the blade from the air path in a direction normal to the axis of the compressor. Alternatively the blade may be supported on one end of a screw-threaded rod which is movable in a direction normal to the axis of the compressor by engagement with a rotatable nut. In a further alternative, the blade may be moved radially by means of a piston slidable in a cylinder, for example a pneumatic jack, the blade being mounted for movement either on the cylinder, the piston being stationary with respect to the rotor or stator, or vice versa.

Whilst in the compressor shown in Figure 2 provision is made for withdrawing a number of blade rows both in the rotor and stator, it may be sufficient in a simplified form of compressor to provide for the withdrawal of only one blade row, which will normally be the compressor outlet stator row since the greatest pressure loss will occur in the last downstream blade rows. If this blade row is located downstream of the compressor rotor, the blades may be withdrawn through either the inner or outer wall of the duct. Alternatively some but not all of the blades of any one row may be withdrawable.

In an alternative form of turbo-rocket, in which some only of the compressor blades are withdrawable, the compressor stator blades may be withdrawable while a conventional compressor rotor is used. In such case, under ram jet operating conditions the compressor rotor may be permitted to windmill in the intake air stream, and to reduce windage losses in the turbine, means may be provided for partially evacuating the turbine interior, or alternatively the reduction gearbox may incorporate a clutch or a freewheel mechanism. It may be possible to derive some power from the windmilling compressor for driving pumps or other accessories.

In a further alternative form of turbo-rocket, the closure members of the inlet to the by-pass passage may take the form of scoops slidable towards the axis of the main duct to uncover the inlet from positions in which they form part of the outer wall of the duct; or alternatively closure means may be provided by a plain annulus slidable longitudinally on the outer wall of the main duct to cover or uncover the said inlet, or again, if the inlet is formed by a number of apertures spaced around the outer wall in a plane normal to the axis of the duct, the closure may be an annulus rotatable in this plane and having correspondingly spaced apertures. As an additional feature, a separate air intake to the ram jet combustion chamber from atmosphere may be provided.

Figure 5 shows a by-pass form of jet engine comprising a main duct 160 housing an axial-flow low pressure compressor 163, a main gas turbine engine 148 fed with air from the low pressure compressor, an annular by-pass duct 162 surrounding the main engine and also fed with air from the low pressure compressor, and a propulsion nozzle 172 which is preferably of variable area through which gases both from the main engine and the by-pass duct discharge to atmosphere as a propulsive jet.

The main engine comprises a high pressure compressor 153, one or more combustion chambers 156 and a turbine 149 having two independent rotors 150, 151, each connected to drive one of the compressors 153, 163 through coaxial shafting 152.

Figure 3:
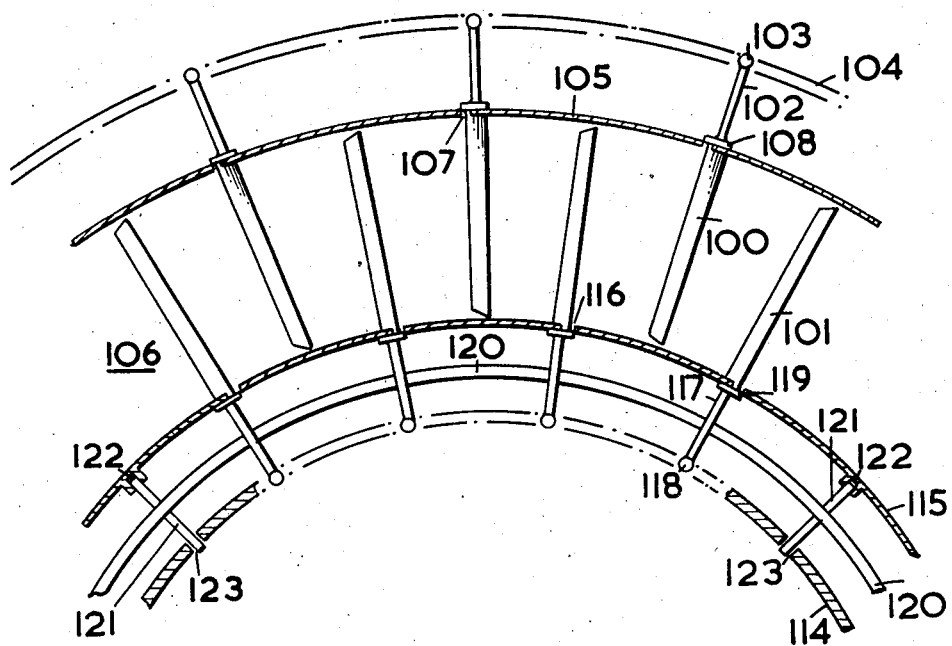
Figure 3 is a front sectional elevation showing the compressor blading of Figure 2 in an operative position.
Figure 4:
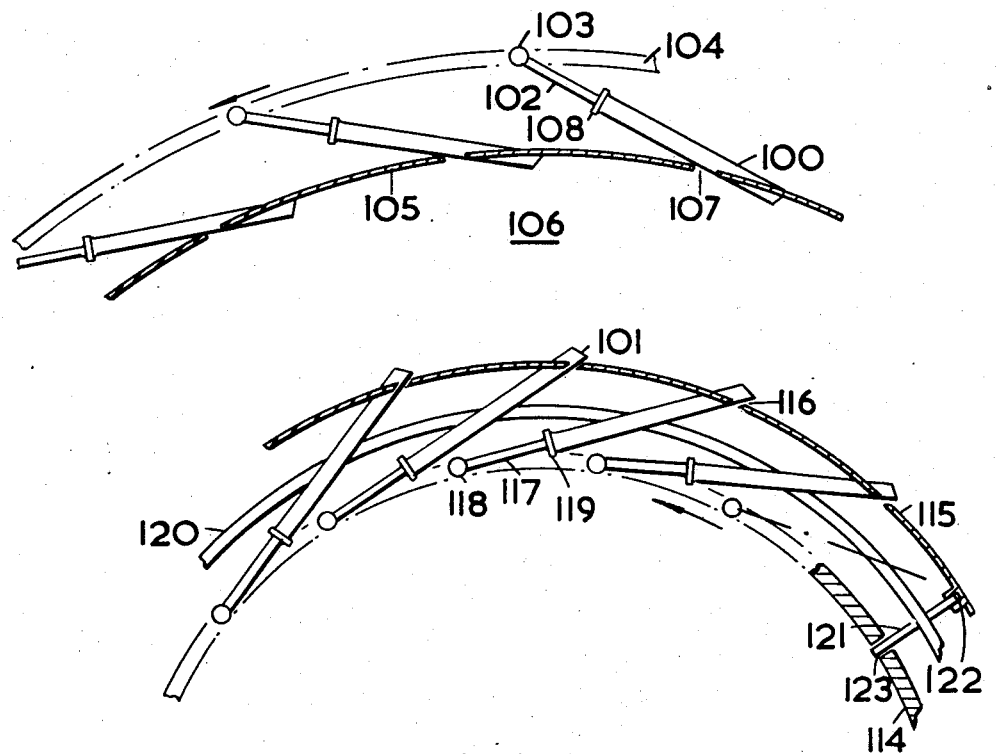
Figure 4 is a corresponding view showing the compressor blading in an inoperative position.

The low pressure compressor 163 is provided with stator blading 164 withdrawable in the manner shown in Figures 2, 3 and 4. In addition a by-pass passage 166 is formed between the outer wall 167 of the main duct and an engine casing 168, the passage having inlet and outlet closure members 169, 170 in the form of flaps operated by pneumatic or hydraulic jacks 158, 159, or in the alternative forms described above. The by-pass duct 162 is formed with a ram jet combustion chamber 171.

At take-off, the by-pass passage is closed and the engine is operated in the normal by-pass manner. At air speeds sufficient to permit ram jet operation, the engine may be converted to a ram jet, the stator blading of the low pressure compressor being withdrawn, the main engine being shut down or permitted to idle and the by-pass passage opened to provide an alternative path for air from the intake into the ram jet combustion chamber 171 to which the main or whole fuel supply is thereafter directed.

During ram jet operation, all possible gas paths through the engine are used and in this connection the gas path through the main engine may be maintained open. In addition a separate air intake from atmosphere opening directly into the by-pass duct may be provided.

In a modification of this embodiment, the low pressure compressor rotor and the high pressure compressor may also be provided with withdrawable blading in the form shown in Figures 2 and 4, and in such a modification the by-pass passage may be omitted.

In a further modification, means may be provided for diverting some of the air flowing in the by-pass duct directly in the combustion chamber or chambers 156 of the main engine; for example, the inner wall 173 of the by-pass duct may be apertured in the vicinity of the main engine combustion chamber or chambers to provide a path for air from the by-pass duct into the main engine combustion air stream, means being provided to open or close the apertures which means may take the form of closure members such as those described above.

Figure 6 shows a ducted fan engine which comprises a main duct 175 housing the main engine 176, and an annular outer duct 177 surrounding the rearward portion of the main engine and containing a ram jet combustion chamber 178. A fan in the outer duct comprises stator blading 179 co-operating with a row of rotor blading 180 which is mounted on and therefore driven directly by a turbine 181 in the main engine. The stator blading 179 of the fan is withdrawably mounted in the manner shown in Figures 2 to 4 and a by-pass passage 182 is formed in parallel with the outer duct between the outer wall 183 of the outer duct and a casing 184 as in the embodiment described above.

When the ducted fan engine is converted from normal operation to ram jet operation, the main engine is shut down or allowed to idle, the stator blading of the fan is withdrawn and the by-pass passage is opened to admit maximum air flow into the ram jet combustion chamber from which thereafter the main or sole propulsion gas stream is derived.

In a modification of this embodiment, the compressor 185 of the main engine may also be provided with blading which is withdrawable in the manner shown in Figures 2 to 4.

In any of the above embodiments of jet propulsion engine, when operating under ram jet conditions, the air intake area may be adjusted to vary the quantity of air admitted, for example by means of an axially slidble intake cone cooperting with a throated portion of the outer wall of the main duct. In addition such compressor blading as is not withdrawable may be feathered to further reduce pressure losses as in co-pending application Serial No. 612,628. This is particularly applicable to compressor blades of high stagger and small camber design.

It will be seen that the numerous features described above may be combined in various ways to provide many further alternative embodiments of jet propulsion engine within the present invention.

We claim:

1. A dynamic compressor comprising in combination a pair of coaxial cylindrical compressor walls defining therebetween an annular duct, a blade supporting structure coaxial with but radially spaced from one of said compressor walls externally of the duct, compresor blades pivotally supported on said supporting structure and extending into said duct through apertures in said one compressor wall and means for moving said supporting structure relatively to said one compressor wall to vary the length of the compressor blade portions within the duct.

2. A dynamic compressor according to claim 1 including means supporting said blade supporting structure for rotational movement about the axis of the compressor.

3. A jet propulsion engine comprising in combination an air inlet, a jet propulsion nozzle, inner and outer walls defining therebetween an annular duct, said duct interconnecting the inlet and the nozzle, a combustion chamber in the duct, a dynamic compressor located in the duct between the inlet and the chamber and including axial flow compressor blading which extends into said duct through apertures in one of said walls, compressor driving means, a driving coupling connected between the compressor driving means and the compressor, a compressor blade supporting structure coaxial with but radially spaced from said one duct wall externally of the duct pivotally supporting said compressor blading and means for moving said supporting structure relatively to said one duct wall to vary the length of compressor blade portions within the duct during operation of the engine.

4. A jet propulsion engine according to claim 3 including means supporting said blade supporting structure for rotational movement about the axis of the compressor.

5. A jet propulsion engine according to claim 3 in which the compressor comprises a plurality of rows of stator blading, at least the final downstream row of which is withdrawable.

6. A jet propulsion engine according to claim 5 including means supporting said blade supporting structure for rotational movement about the axis of the compressor.

7. A jet propulsion engine according to claim 3 in which the compressor driving means comprise a turbine and a rocket fuel combustion chamber arranged to discharge rocket gas for expansion through the turbine.

8. A jet propulsion engine according to claim 7 including means supporting said blade supporting structure for rotational movement about the axis of the compressor.

9. A jet propulsion engine as claimed in claim 7 in which a secondary duct is provided from the rocket fuel combustion chamber via the turbine to an outlet leading into the combustion chamber into which said compressor discharges.

10. A jet propulsion engine as claimed in claim 9 including means supporting said blade supporting structure for rotational movement about the axis of the compressor.

11. A jet propulsion engine as claimed in claim 3 including a by-pass passage interconnecting the inlet and the combustion chamber in parallel with said duct, and means for controlling the fluid flow through said by-pass passage comprising valve means operable to close off the by-pass passage and to open it to permit flow therethrough in addition to parallel flow through said duct.

12. A jet propulsion engine as claimed in claim 11 including means supporting said blade supporting structure for rotational movement about the axis of the compressor.

References Cited in the file of this patent

UNITED STATES PATENTS

| 1,835,284 | Crowhurst | Dec. 8, 1931 |
| 2,407,454 | Seewer | Sept. 10, 1946 |
| 2,464,724 | Sédille | Mar. 15, 1949 |
| 2,619,797 | Haworth | Dec. 2, 1952 |
| 2,659,196 | Brown | Nov. 17, 1953 |
| 2,716,329 | Lunger | Aug. 30, 1955 |
| 2,754,655 | Holzworth | July 17, 1956 |
| 2,762,192 | Ward | Sept. 11, 1956 |
| 2,801,789 | Moss | Aug. 6, 1957 |
| 2,832,192 | Budish | April 29, 1958 |

FOREIGN PATENTS

| 1,010,604 | France | Mar. 26, 1952 |
| 599,391 | Great Britain | Mar. 11, 1948 |